J. W. LAWHEAD.
CONNECTING DEVICE.
APPLICATION FILED JUNE 3, 1910.

1,006,664.

Patented Oct. 24, 1911.

Witnesses
E. Bmaurer.
A. L. Phelps.

Inventor
James W. Lawhead

By
C. C. Shepherd
Attorney

UNITED STATES PATENT OFFICE.

JAMES W. LAWHEAD, OF WILMINGTON, OHIO.

CONNECTING DEVICE.

1,006,664.  Specification of Letters Patent.  Patented Oct. 24, 1911.

Application filed June 3, 1910. Serial No. 564,738.

*To all whom it may concern:*

Be it known that I, JAMES W. LAWHEAD, a citizen of the United States, residing at Wilmington, in the county of Clinton and State of Ohio, have invented certain new and useful Improvements in Connecting Devices, of which the following is a specification.

My invention relates to the improvement of connecting devices of that class which are adapted for the connection or detachable coupling together of two members such as the marginal portions of horse blankets, strap ends or other devices or parts thereof, which are intended to be readily connected and disconnected, and the objects of my invention are to provide a simple and inexpensive connecting device of this class by means of which the two sections or members constituting the device, may be readily and effectively connected one with the other, in such manner as to obviate any tendency toward a voluntary disconnection of the same; to so construct my improved connecting device as to effect a flexible connection between two connected members and to produce other improvements the details of which will be more fully pointed out hereinafter. These objects I accomplish in the manner illustrated in the accompanying drawing, in which—

Figure 1:
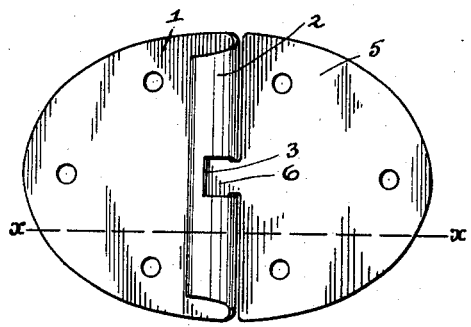
Figure 2:
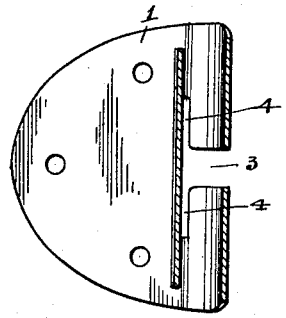
Figure 3:
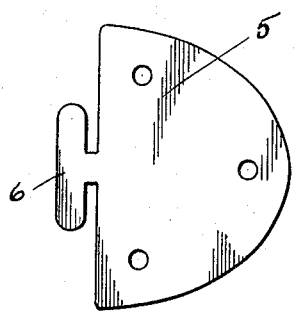
Figure 4:
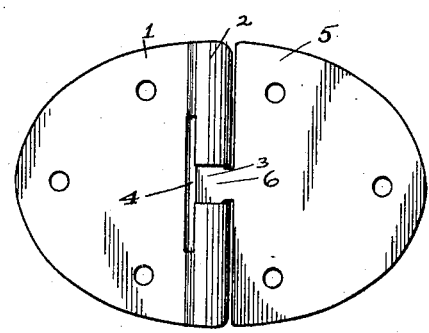
Figure 5:
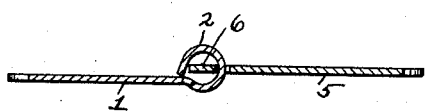

Figure 1 is a face view of my connecting device showing the members thereof in engagement one with the other. Fig. 2 is a longitudinal section through the tubular or barrel portion of one of the connecting members, Fig. 3 is a face view of the opposing connecting member to that shown in Fig. 2, Fig. 4 is a rear side view of the two members shown in connection with each other, and, Fig. 5 is a sectional view on line $x$—$x$ of Fig. 1.

Similar numerals refer to similar parts throughout the several views.

In carrying out my invention, I employ two connecting bodies or members, one of which is indicated at 1 and comprises a suitable plate, one side of which is bent or curved outwardly and inwardly to form an elongated barrel or tubular member 2, which projects outward beyond the plane of the body 1. At or about the center of the length of the tubular member 2, said member has formed therein a transverse slotted opening 3 which leads through the greater portion of the tubular body and which on the under or rear side of the member 2, communicates with the central portion of a narrower slot 4 which is formed at the rear of the plate 1 at its junction with the curved member 2 and which extends lengthwise of said curved or tubular member.

5 represents the second and remaining connecting member, which also comprises a suitably formed plate or body having an inner straight edge or side, from which projects a preferably flat T-shaped tongue 6, the latter being a continuation of the body 5.

In utilizing my connecting device, it will be understood that the plate members or bodies 1 and 5 are adapted to be suitably attached to opposing objects to be connected, such as blanket marginal portions, strap ends and the like and in forming the connection, it will be understood that the members 1 and 5 are first brought together in such manner as to form an acute angle between the same, the head of the tongue 6 being inserted while in this position through the elongated slot 4, after which the members 1 and 5 are turned until the tongue 6 is locked against voluntary movement through the slot 14. In detaching the parts, it is obvious that the members 1 and 5 must be moved toward each other to again form an acute angle between the plates before withdrawal of the tongue 6.

From the construction described, it will be seen that an exceedingly simple, although effective connecting device is provided which may be utilized for many purposes and the parts of which may be readily manipulated for the purpose of connecting and disconnecting the same. Furthermore, the provision of the transverse slot 4 in the rear of the curl upon the end of the socket member and in close proximity to the point of juncture of the curl with the body, gives a degree of strength exceeding anything previously known among connections of this type.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claim.

What I claim, is—

A belt coupling comprising a socket member of sheet metal having its end curled and having a longitudinal slot and a transverse communicating slot formed in the rear of said curl, and a tongue member having a T-shaped head.

In testimony whereof I affix my signature in presence of two witnesses.

JAMES W. LAWHEAD.

Witnesses:
O. W. HALE,
E. M. CARR.